United States Patent
Watanabe

(10) Patent No.: US 8,764,416 B2
(45) Date of Patent: Jul. 1, 2014

(54) CLOSED TYPE COMPRESSOR

(75) Inventor: Kiwamu Watanabe, Shiga (JP)

(73) Assignee: Panasonic Corporation, Osaka (JP)

( * ) Notice: Subject to any disclaimer, the term of this patent is extended or adjusted under 35 U.S.C. 154(b) by 256 days.

(21) Appl. No.: 13/056,260

(22) PCT Filed: Jul. 21, 2009

(86) PCT No.: PCT/JP2009/003396
§ 371 (c)(1),
(2), (4) Date: Jan. 27, 2011

(87) PCT Pub. No.: WO2010/013403
PCT Pub. Date: Feb. 4, 2010

(65) Prior Publication Data
US 2011/0129371 A1    Jun. 2, 2011

(30) Foreign Application Priority Data
Jul. 31, 2008 (JP) ................... 2008-197333

(51) Int. Cl.
*F04B 35/04* (2006.01)
*F16C 3/20* (2006.01)
*F04B 53/00* (2006.01)

(52) U.S. Cl.
CPC . *F16C 3/20* (2013.01); *F04B 35/04* (2013.01); *F04B 53/006* (2013.01)
USPC .................. 417/415; 74/604; 92/72

(58) Field of Classification Search
CPC ........... F16C 3/20; F04B 35/04; F04B 53/006
USPC .................. 417/415; 74/595, 604; 92/72
See application file for complete search history.

(56) References Cited

U.S. PATENT DOCUMENTS 3,189,255 A * 6/1965 Enemark ............ 417/415
4,406,590 A   9/1983 Kessler
(Continued)

FOREIGN PATENT DOCUMENTS

| CN | 1955469 A | 5/2007 |
| EP | 1815139 B1 | 12/2009 |
| WO | WO 2005/003560 A1 | 1/2005 |
| WO | WO 2007/049461 A1 | 5/2007 |

OTHER PUBLICATIONS

International Search Report for International Application No. PCT/JP2009/003396, dated Dec. 10, 2009, 3 pages.

(Continued)

*Primary Examiner* — Charles Freay
(74) *Attorney, Agent, or Firm* — Brinks Gilson & Lione

(57) ABSTRACT

A closed type compressor of a low overall height and small vibrations provided with a structure comprising a balancing weight (142) formed of a first balancing weight (146) and a second balancing weight (148) and fixed to eccentric shaft portion (112), the first balancing weight (146) located closer to a main shaft portion (109) than the second balancing weight (148), and the second balancing weight (148) jutting out to a position further from an axis of the eccentric shaft portion (112) than the first balancing weight (146).

2 Claims, 5 Drawing Sheets

(56) References Cited

U.S. PATENT DOCUMENTS

| | | |
|---|---|---|
| 6,089,840 A | 7/2000 | Iizuka et al. |
| 6,098,477 A * | 8/2000 | Takachi et al. ............ 74/52 |
| 6,098,840 A * | 8/2000 | Ito et al. ............ 221/232 |
| 6,135,727 A | 10/2000 | Dreiman et al. |
| 6,195,888 B1 | 3/2001 | Calciolari et al. |
| 6,412,366 B1 * | 7/2002 | Leith ............ 74/603 |
| 7,509,890 B2 * | 3/2009 | Cagney et al. ............ 74/595 |
| 2006/0153710 A1 | 7/2006 | Kakiuchi et al. |
| 2009/0092504 A1 | 4/2009 | Akashi et al. |

OTHER PUBLICATIONS

Written Opinion of the International Searching Authority for International Application No. PCT/JP2009/003396, dated Dec. 10, 2009, 6 pages.

* cited by examiner

CLOSED TYPE COMPRESSOR

This application is a 371 application having an international filing date of Jul. 21, 2009 which claims priority to JP2008-197333 filed on Jul. 31, 2008, the entire contents of which are incorporated herein by reference.

TECHNICAL FIELD

The present invention relates to a closed type compressor used for an apparatuses equipped with a refrigeration cycle such as a refrigerator/freezer, vending machine and air conditioner.

BACKGROUND ART

A closed type compressors hitherto available generally have such a structure that a crank shaft is provided with a balancing weight attached to an upper end of an eccentric shaft portion in order to reduce vibrations (refer to patent reference 1 for example).

Referring now to the accompanying drawings description is provided hereinafter of a closed type compressor of the conventional type discussed above. FIG. 4 is a longitudinally sectioned view of the conventional closed type compressor disclosed in the patent reference 1. FIG. 5 is a perspective view of a balancing weight used for the conventional closed type compressor disclosed in the patent reference 1.

In FIG. 4 and FIG. 5, sealed container 1 encloses therein a refrigerant (not shown) and oil 2. Sealed container 1 also contains compressor component 3 and electric motor component 4 for driving compressor component 3.

Block 5 constituting compressor component 3 has compression chamber 6 formed therein. Piston 7 is inserted in compression chamber 6 in a reciprocatory movable manner.

Crank shaft 8 includes main shaft portion 9 fixed to electric motor component 4 and eccentric shaft portion 12 inserted in large end hole portion 61 of connecting rod 10. Crank shaft 8 is pivotally supported in bearing portion 21 of block 5. Crank shaft 8 has oblique hole 13 formed inside main shaft portion 9 to constitute oil pump 31. Oblique hole 13 is opened in communication with a lower end of helical groove 14 formed in an outer periphery of main shaft portion 9, the helical groove 14 also constituting oil pump 31.

Eccentric shaft portion 12 is provided with oil channel 15 in communication with helical groove 14, and oil channel 15 is opened at top end 16 of eccentric shaft portion 12. Connecting rod 10 includes large end hole portion 61 and small end hole portion 63. Small end hole portion 63 is inserted in piston pin 20 fixed to piston 7, and large end hole portion 61 is connected with eccentric shaft portion 12 by insertion.

Balancing weight 42 is made of an iron plate or the like material, and fixed to upper end 19 of eccentric shaft portion 12 of crank shaft 8. Balancing weight 42 is so formed that it juts out toward piston 7 when piston 7 is at the bottom dead center in its reciprocating motion.

The conventional closed type compressor constructed as above operates in a manner, which is described hereinafter. When electric power is supplied to electric motor component 4, it drives to rotate crank shaft 8. A rotary motion of eccentric shaft portion 12 provided by the rotation of crank shaft 8 drives piston 7 through connecting rod 10 to reciprocate piston 7 inside compression chamber 6. This motion compresses the refrigerant (not shown) continuously.

During this compressing operation, the reciprocating motion of piston 7 generates an inertial force. In addition, the rotary movement of eccentric shaft portion 12 exerts a centrifugal force on eccentric shaft portion 12. An unbalanced component resulting from this inertial force of piston 7 and the centrifugal force of eccentric shaft portion 12 becomes a cause of vibrations of the closed type compressor.

Balancing weight 42 is thus provided in a manner to cancel out the inertial force of piston 7 and the centrifugal force of eccentric shaft portion 12. Accordingly, the inertial force of piston 7 and the centrifugal force of eccentric shaft portion 12 are counterbalanced with an inertial force of balancing weight 42 to decrease the vibrations.

It is necessary for this purpose, however, that the center of gravity of balancing weight 42 is located away from the axis of the eccentric shaft portion beyond the central axis of the main shaft, and that balancing weight 42 has a sufficient weight. As a result, there arises a possibility that weight body 44 of balancing weight 42 comes into contact with piston 7 as it juts out toward piston 7 when piston 7 comes to a position at the bottom dead center during its reciprocating motion.

It is therefore necessary for eccentric shaft portion 12 having balancing weight 42 fixed to upper end 19 to be long enough to avoid weight body 44 of balancing weight 42 from coming into contact with piston 7. This results in an added weight of eccentric shaft portion 12, thereby giving rise to a problem of generating a large centrifugal force that increases vibrations.

To avoid weight body 44 of balancing weight 42 from coming into contact with piston 7 without changing the length of eccentric shaft portion 12, weight body 44 needs to be bent in angle with respect to the base of balancing weight 42 as shown in FIG. 4. In the case of using this structure, however, weight body 44 comes close to an inner surface of sealed container 1. This structure thus has another problem that sealed container 1 needs to be increased in height to avoid them from coming into contact with each other.

Patent reference 1: U.S. Pat. No. 6,195,888.

SUMMARY OF THE INVENTION

The present invention provides a closed type compressor featuring small vibrations with a low overall height.

The closed type compressor of this invention includes an electric motor component and a compressor component enclosed inside a sealed container, a crank shaft having a main shaft portion and an eccentric shaft portion, a block having a compression chamber formed therein, a piston inserted so as to be movable reciprocally inside of the compression chamber, a connecting rod connecting the piston and the eccentric shaft portion, and a balancing weight fixed to one end of the eccentric shaft portion opposite the main shaft portion. The balancing weight includes a first balancing weight and a second balancing weight, and so formed that the first balancing weight is disposed at one side facing closer to the main shaft portion than the second balancing weight, and the second balancing weight juts out to a position further away from an axis of the eccentric shaft portion than the first balancing weight.

Since this structure allows the balancing weight to be fixed to the eccentric shaft portion having a short length, it reduces a weight of the eccentric shaft portion, thereby abating a level of vibrations. In addition, the structure can also reduce an overall height of the closed type compressor.

DETAILED DESCRIPTION OF THE PREFERRED EMBODIMENTS

Description is provided hereinafter of an exemplary embodiment of the present invention with reference to the accompanying drawings. It should be understood that the scope of the present invention is not restricted by the exemplary embodiment described herein.

EXAMPLE 1

Figure 1:
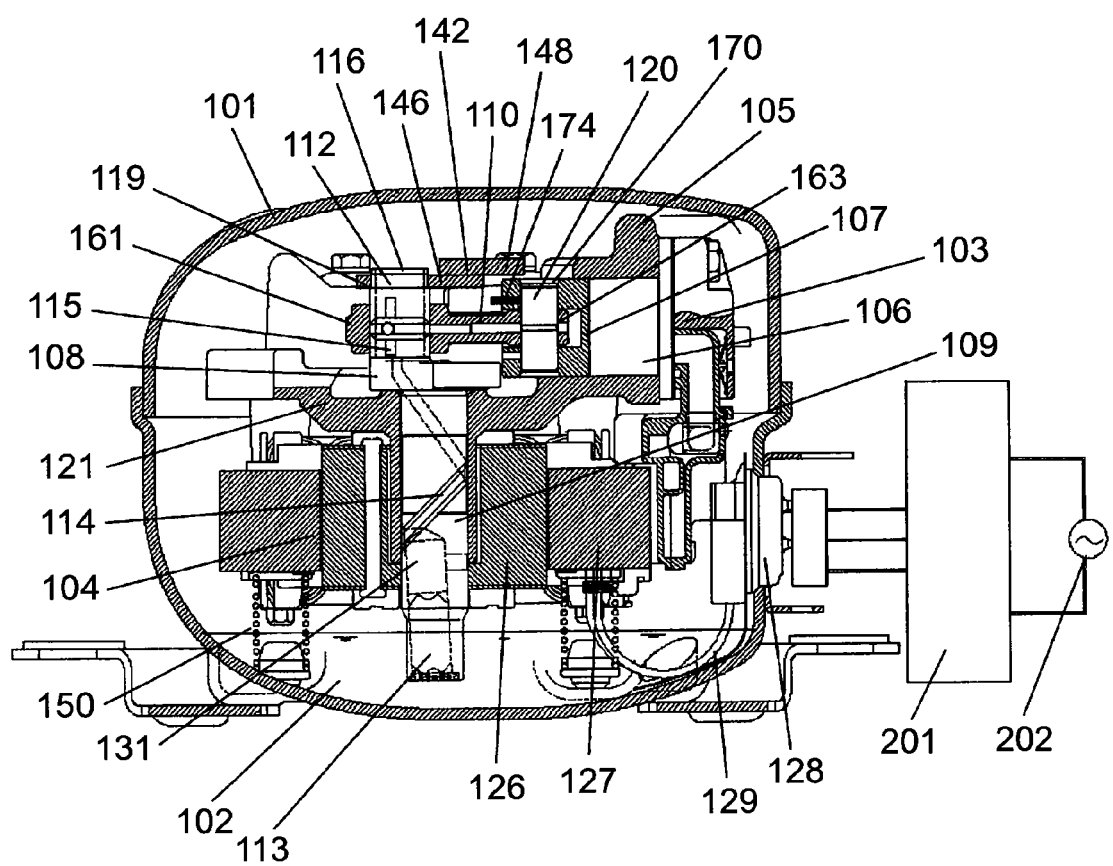
FIG. 1 is a longitudinally sectioned view of a closed type compressor according to a first exemplary embodiment of the present invention.
Figure 2:
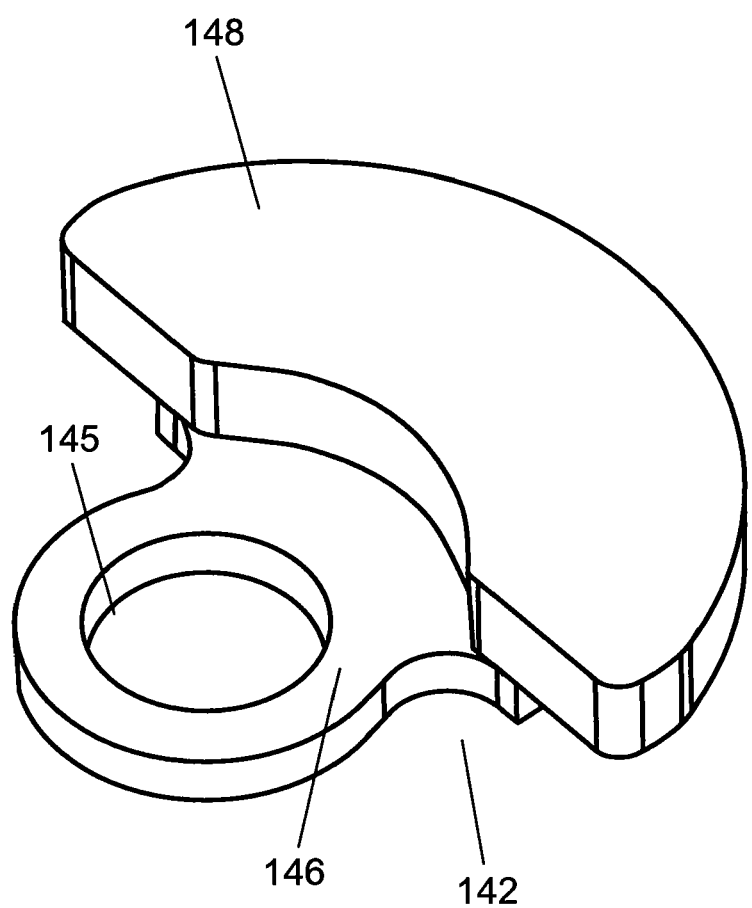
FIG. 2 is a perspective view of a balancing weight according to the same exemplary embodiment.
Figure 3:
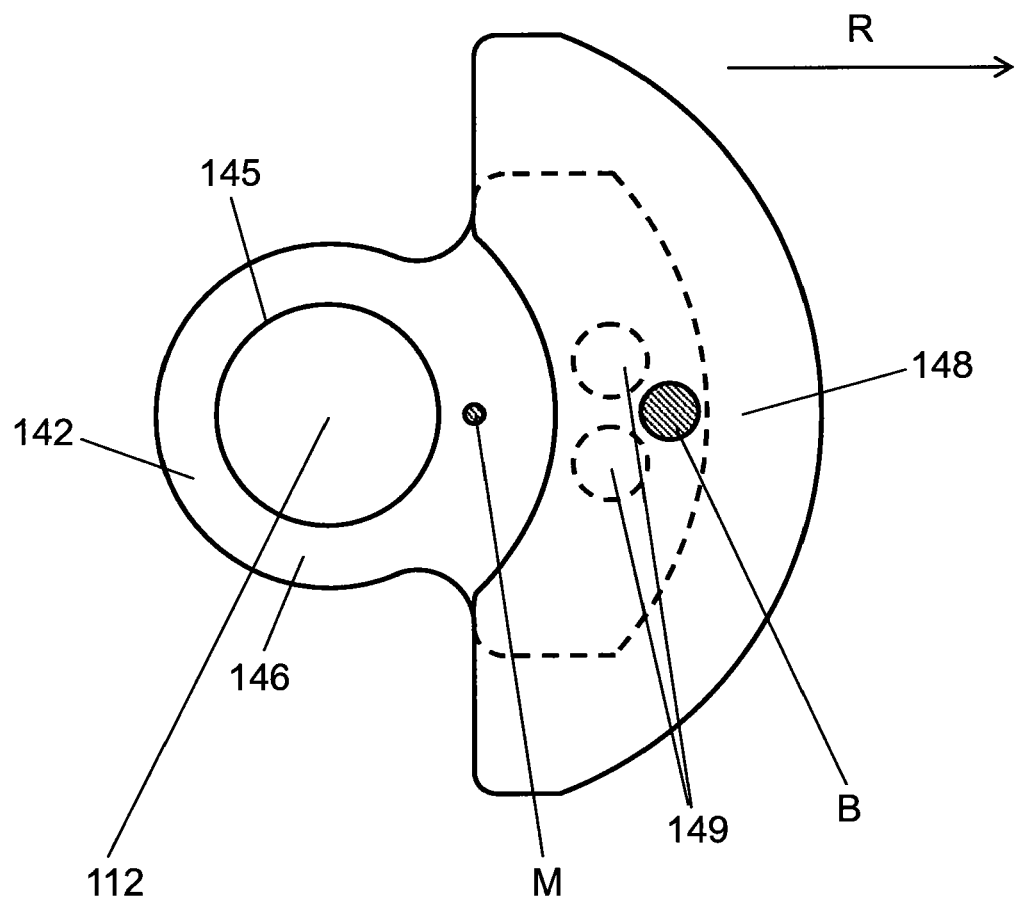
FIG. 3 is a top view of the balancing weight according to the same exemplary embodiment.
Figure 4:
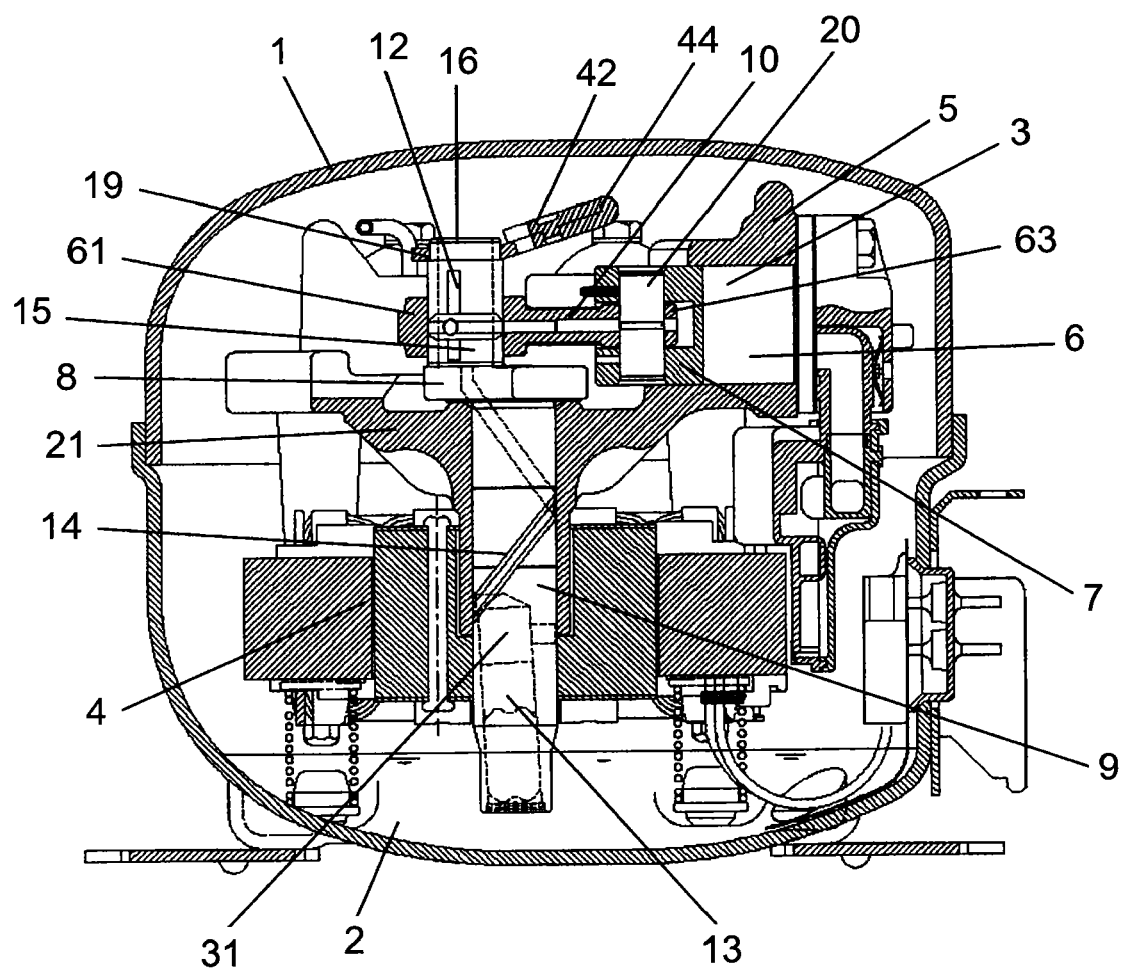
FIG. 4 is a longitudinally sectioned view of a conventional closed type compressor.
Figure 5:
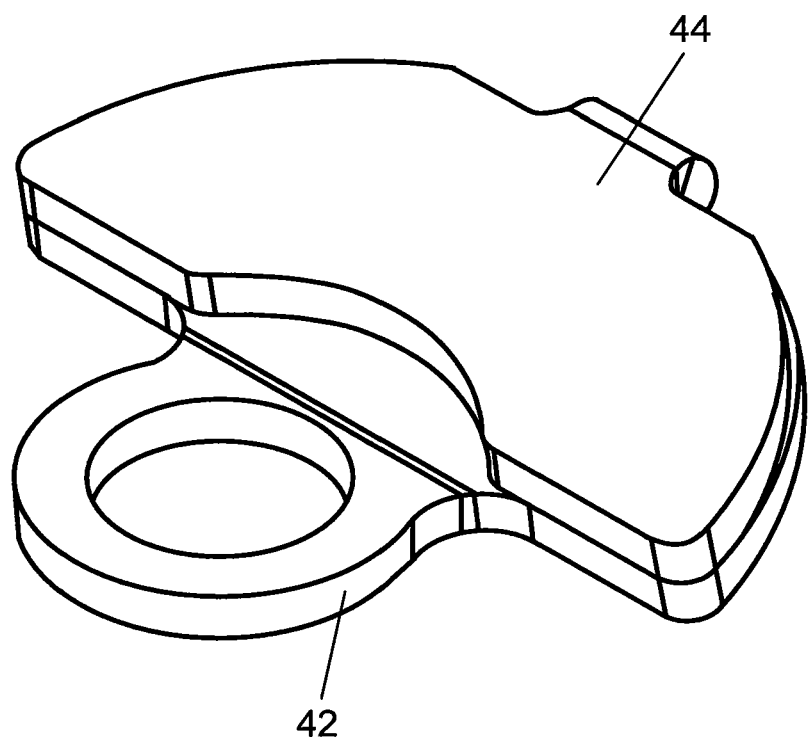
FIG. 5 is a perspective view of a balancing weight used in the conventional closed type compressor.

FIG. 1 is a longitudinally sectioned view of a closed type compressor according to the first exemplary embodiment of this invention, showing the view in a plane sectioned longitudinally along both axes of eccentric shaft portion 112 and main shaft portion 109. The view shown in FIG. 1 is in a state when piston 107 is located at its bottom dead center. FIG. 2 is a perspective view of a balancing weight according to the same exemplary embodiment. FIG. 3 is a top view of the balancing weight of the same exemplary embodiment.

In FIG. 1, the closed type compressor of this exemplary embodiment is provided with inverter control circuit 201 outside of sealed container 101 for receiving a supply of power from commercial mains 202. Inverter control circuit 201 is connected to terminals 128 fixed to sealed container 101.

Sealed container 101 contains therein electric motor component 104 consisting of rotor 126 and stator 127. Electric motor component 104 is connected to terminals 128 with lead wires 129. Sealed container 101 also contains compressor component 103 in a position above electric motor component 104 and driven by electric motor component 104. Both electric motor component 104 and compressor component 103 are supported elastically by springs 150. Sealed container 101 is filled with a refrigerant (not shown), and it stores oil 102 in a bottom space thereof.

Crank shaft 108 includes main shaft portion 109 press-fitted to rotor 126, and eccentric shaft portion 112 formed eccentrically with respect to main shaft portion 109.

Crank shaft 108 is provided with oblique hole 113 to constitute oil pump 131. Main shaft portion 109 is provided with helical groove 114 cut in an outer periphery thereof in a spiral configuration extending upward with inclination in a direction opposite the rotating direction of crank shaft 108 so as to form a part of oil pump 131. There is also oil channel 115 formed inside eccentric shaft portion 112. A lower end of oblique hole 113 is opened under oil 102. Helical groove 114 has its lower end in communication with an upper end or the vicinity of oblique hole 113, and its upper end in communication with a lower end or the vicinity of oil channel 115. Oil channel 115 is opened at top end 116 of eccentric shaft portion 112 into the space inside sealed container 101.

Block 105 has compression chamber 106 of generally a cylindrical shape. Block 105 also has bearing portion 121 for pivotally supporting main shaft portion 109, and it is disposed above electric motor component 104.

Piston 107 is inserted in compression chamber 106 in a reciprocatory movable manner. Piston 107 is provided with piston-pin hole 170 perforated in parallel to the axis of eccentric shaft portion 112, and piston pin 120 of a hollow cylindrical shape is fitted to piston-pin hole 170. Piston pin 120 is fixed to piston 107 with lock pin 174 of a hollow cylindrical shape.

Eccentric shaft portion 112 and piston 107 are linked with connecting rod 110. Large end hole portion 161 at one end of connecting rod 110 is connected with eccentric shaft portion 112 by insertion, and small end hole portion 163 at the other end of connecting rod 110 is fitted to piston pin 120.

Balancing weight 142 is fixed to upper end 119 of eccentric shaft portion 112 opposite the main shaft portion. As shown in FIG. 2, balancing weight 142 includes first balancing weight 146 fixed to upper end 119 of eccentric shaft portion 112 and second balancing weight 148 formed of a separate member disposed at the side opposite the main shaft portion (i.e., an upper side in FIG. 1). In other words, second balancing weight 148 is disposed at one side of first balancing weight 146 closer to the end of eccentric shaft portion 112.

First balancing weight 146 and second balancing weight 148 are fixed together into one piece by such means as resistance welding. Fastening portion 145 of first balancing weight 146 fixed to eccentric shaft portion 112 has generally a cylindrical shape of an inner diameter slightly smaller than an outer diameter of upper end 119 of eccentric shaft portion 112, and it is fixed to upper end 119 by means of press fitting or shrinkage fitting. First balancing weight 146 is in a position facing closer to main shaft portion 109 (i.e., a lower side in FIG. 1) than second balancing weight 148. Second balancing weight 148 is so shaped that it juts out to a position further away from the axis of eccentric shaft portion 112 than first balancing weight 146 as shown in FIG. 3. Barycentric position B of the balancing weight is located at a point away from axle M of the main shaft portion in a direction R opposite the eccentric shaft. As is obvious from FIG. 1, second balancing weight 148 comes to a position opposite the main shaft portion with respect to piston 107 when piston 107 is located at its bottom dead center.

That is, a surface of second balancing weight 148 at one side facing the main shaft portion (i.e., a lower surface in FIG. 1) is in a position further away toward a side opposite the main shaft portion (i.e., the upper side in FIG. 1) than a surface of piston 107 at the side opposite the main shaft portion (i.e., an upper surface in FIG. 1). At the same time, a surface of first balancing weight 146 at one side facing the main shaft portion (i.e., a lower surface in FIG. 1) is in a position closer to the main shaft portion (i.e., the lower side in FIG. 1) than the surface of piston 107 at the side opposite the main shaft portion. Here, first balancing weight 146 and second balancing weight 148 are fixed together in fixing portions 149.

Second balancing weight 148 is formed of a material having a specific gravity greater than that of first balancing weight 146 to make it heavier in weight than first balancing weight 146.

The closed type compressor constructed as above operates in a manner, which is described hereinafter. Electric power supplied from commercial mains 202 is delivered to terminals 128 through inverter control circuit 201, and fed to electric motor component 104 via lead wires 129. This causes rotor 126 of electric motor component 104 to rotate at a given rotating speed. Rotor 126 rotates crank shaft 108 and makes eccentric shaft portion 112 move eccentrically. The eccentric movement of eccentric shaft portion 112 drives piston 107 through connecting rod 110 into a reciprocating motion inside compression chamber 106 and compresses the refrigerant (not shown) continuously.

Balancing weight 142 comprised of first balancing weight 146 and second balancing weight 148 is fixed to upper end 119 of eccentric shaft portion 112, and it rotates with eccentric shaft portion 112. Accordingly, an inertial force of balancing weight 142 cancels out effectively an unbalanced component consisting of an inertial force generated by the reciprocating motion of piston 107 and a centrifugal force generated by eccentric shaft portion 112 in a manner to decrease vibrations of the closed type compressor.

In this exemplary embodiment, first balancing weight 146 fixed to eccentric shaft portion 112 is positioned closer to main shaft portion 112 than second balancing weight 148. In addition, second balancing weight 148 is shaped in a manner to jut out to the position further from the axis of eccentric shaft portion 112 than first balancing weight 146. It becomes possible by virtue of this structure to shorten the length of eccentric shaft portion 112 while avoiding second balancing weight 148 jutting out above piston 107 from coming into contact with piston 107 when piston 107 reaches the bottom dead center. This structure can hence decrease the weight of eccentric shaft portion 112 and reduce the centrifugal force exerted on eccentric shaft portion 112 by the rotation of main shaft portion 109 of crank shaft 108, thereby reducing the unbalanced component. Accordingly, the invention can provide the closed type compressor of a substantially low level of vibrations. In addition, shortening of the length of eccentric shaft portion 112 can decrease the overall height of the closed type compressor. Moreover, the reduction in the weight of eccentric shaft portion 112 can reduce the weight and size of balancing weight 142 so as to further decrease the overall height of the closed type compressor.

In this exemplary embodiment, second balancing weight 148 is formed larger in thickness than that of first balancing weight 146 to make it heavier as compared to first balancing weight 146. This structure is to shift the barycentric position B of balancing weight 142 further toward the direction R opposite the eccentric shaft as shown in FIG. 3, to thereby increase a moment weight of balancing weight 142 for canceling out the unbalanced component. Since this structure can effectively cancel out the unbalanced component, it provides the closed type compressor with even a lower level of vibrations.

In order to increase the weight of second balancing weight 148 in comparison with first balancing weight 146, besides the example described above, another example is to increase the length of second balancing weight 148 that juts out further than first balancing weight 146 from the axis of eccentric shaft portion 112.

It is also possible to reduce the weight of first balancing weight 146 as a result of using second balancing weight 148 of the heavier weight than that of first balancing weight 146. A part of the weight of first balancing weight 146 around the area fixed to eccentric shaft portion 112 contributes to a magnitude of the centrifugal force responsible for the unbalanced component, together with the weight of eccentric shaft portion 112. A reduction in the weight of first balancing weight 146 can therefore help decrease the centrifugal force affecting the unbalanced component. It can hence provide the closed type compressor with even further reduction in the level of vibrations.

When second balancing weight 148 is formed of a material having a specific gravity larger than that of first balancing weight 146, second balancing weight 148 of the same given weight can be made even smaller in size and volume to impart the effect of canceling out the unbalanced component. This allows a further reduction in size of balancing weight 142 to provide the closed type compressor of even a smaller size with low level of vibrations.

The structure according to this exemplary embodiment is also useful for effectively canceling out the unbalanced component to achieve the closed type compressor with small vibrations even in a low speed operation driven by an inverter, for instance. The compressor driven by an inverter tends to become more unbalanced during the low speed operation as compared to the normal operation since the low speed operation produces a longer cyclic period of both the inertial force of piston 107 and the centrifugal force of eccentric shaft portion 112. The present exemplary embodiment is also effective in reducing the unbalanced component even in the above case because of eccentric shaft portion 112 having the shortened length and light weight. In addition, the barycentric position of balancing weight 142 shifted further toward the direction R opposite the eccentric shaft results in an increase of the moment weight of balancing weight 142 thereby canceling out the unbalanced component more effectively.

In the case of conventional structure, it has been necessary to adjust the size and weight of balancing weight 142 in order to tune the balance when adapting it for a different kind of closed type compressor. According to the present exemplary embodiment, however, the adjustment can be made by fine-tuning only second balancing weight 148 since balancing weight 142 includes the separate members of first balancing weight 146 and second balancing weight 148. This structure can hence improve the productivity as compared with the conventional structure.

In another case wherein piston 107 of a larger size is used, it is normally necessary to increase the length of eccentric shaft portion 112 to avoid balancing weight 142 from coming into contact with piston 107. According to the present exemplary embodiment, however, it is possible to keep balancing weight 142 in the same position as before without increasing the length of eccentric shaft portion 112 even when the size if piston 107 is increased. The structure can thus avoid the unbalanced component from becoming larger and keep the closed type compressor from increasing in overall height.

The present exemplary embodiment is useful for not only the structure having second balancing weight 148 located above piston 107 when piston 107 is at its bottom dead center but also a structure wherein second balancing weight 148 juts out above any other structural component such as block 105 of compression chamber 106. A similar advantage is also palpable with a structure having balancing weight 142 located below piston 107.

Although what has been illustrated in the present exemplary embodiment is the structure having compressor component 103 disposed above electric motor component 104, this invention is also adaptable even when compressor component 103 is disposed under electric motor component 104.

Industrial Applicability

The closed type compressor of the present invention is useful for a refrigerator, air conditioner, vending machine and the like apparatus since it achieves a low overall height while also reducing vibrations.

The invention claimed is:
1. A closed type compressor comprising:
an electric motor component and a compressor component enclosed inside a sealed container, the compressor component including:
a crank shaft having:
a main shaft portion having an axis extending in a first direction: and an eccentric shaft portion comprising a first end that is proximate to the main shaft portion and an upper end that is opposite to the main shaft portion relative to the first end, wherein an axis of the eccentric shaft portion extends in the first direction parallel to the axis of the main shaft portion;

a block having a compression chamber formed therein;

a piston inserted so as to be removable reciprocally inside of the compression chamber;

a connecting rod connecting the piston and the eccentric shaft portion; and a balancing weight fixed to the upper end of the eccentric shaft portion opposite the main shaft portion, wherein the balancing weight includes a first balancing weight portion and a second balancing weight portion arranged relative to each other such that a barycentric position of the balancing weight is located further from an axis of the eccentric shaft portion than an axis of the main shaft portion in a second direction that is perpendicular to the first direction, the first balancing weight portion is disposed at one side facing closer to the main shaft portion than the second balancing weight portion, and the second balancing weight portion juts out to a position further from central axis of the eccentric shaft portion than the first balancing weight portion, wherein the first balancing weight portion and the second balancing weight portion each comprise a first end and a second end that is further from the axis of the eccentric shaft portion that the respective first end in the second direction, and wherein the first end of the second balancing weight portion is further, in the second direction, from the axis of the eccentric shaft portion of the first balancing weight portion and the second end of the balancing weight portion is further, in the second direction, from the axis of the eccentric shaft portion than the second end of the first balancing weight portion.

2. A closed type compressor comprising:

an electric motor component and a compressor component enclosed inside a sealed container, the compressor component including:

a crank shaft having:

a main shaft portion having an axis extending in a first direction; and an eccentric shaft portion comprising a first end that is proximate to the main shaft portion and an upper end that is opposite to the main shaft portion relative to the first end, wherein an axis of the eccentric shaft portion extends in the first direction parallel to the axis of the main shaft portion;

a block having a compression chamber formed therein;

a piston inserted so as to be movable reciprocally inside of the compression chamber;

a connecting rod connecting the piston and the eccentric shaft portion; and a balancing weight fixed to the upper end of the eccentric shaft portion opposite the main shaft portion, wherein the balancing weight includes a first balancing weight portion and a second balancing weight portion, the first balancing weight portion is disposed at one side facing closer to the main shaft portion than the second balancing weight portion, the first balancing weight portion comprises a first end and a second end that is further, in a second direction that is perpendicular to the first direction, from axis of the eccentric shaft portion than the first end of the first balancing weight portion, and the second balancing weight portion comprising a first end and a second end that is further, in the second direction, from the axis of the eccentric shaft portion than the first end of the second balancing weight portion, wherein the first end of the second balancing weight portion is further, in the second direction, from the axis of the eccentric shaft portion than the first end of the first balancing weight portion and the second end of the second balancing weight portion is further, in the second direction, from the axis of the eccentric shaft portion than the second end of the first balancing portion.

* * * * *